United States Patent [19]

Houston

[11] Patent Number: 4,749,890
[45] Date of Patent: Jun. 7, 1988

[54] MAGNETO HYDRO DYNAMICS SYSTEM

[76] Inventor: Reagan Houston, 252 Foxhunt La., Hendersonville, N.C. 28739

[21] Appl. No.: 38,992

[22] Filed: Apr. 16, 1987

[51] Int. Cl.$^4$ .......................................... H02K 44/08
[52] U.S. Cl. ........................................ 310/11; 417/50
[58] Field of Search ...................... 310/11, 10; 417/50, 417/53, 54

[56] References Cited

U.S. PATENT DOCUMENTS

| | | | |
|---|---|---|---|
| 3,375,664 | 4/1968 | Wells, Jr. | 310/11 |
| 3,376,440 | 4/1968 | Palmer | 310/11 |
| 3,443,129 | 5/1969 | Hammitt | 310/11 |
| 3,453,462 | 7/1969 | Hsu et al. | 310/11 |
| 3,480,804 | 11/1969 | Tipton | 310/11 |
| 4,381,463 | 4/1983 | Branover | 310/11 |

Primary Examiner—Mark O. Budd
Assistant Examiner—Judson H. Jones
Attorney, Agent, or Firm—David M. Carter

[57] ABSTRACT

There is provided a magnetohydrodynamics system which utilizes liquid metal or alloy moving in a channel through a magnetic field to generate electricity. Energy is put into the system by pumping the liquid metal to an elevated collection zone. A portion of the liquid metal is collected in a cooling zone where a solid metal outer skin is formed in the shape of a piston. Pressure is applied to the bottom of the piston to move the piston and a portion of the remaining liquid metal to the collection zone where the metal is heated thus remelting the piston and cycle is repeated.

20 Claims, 2 Drawing Sheets

MAGNETO HYDRO DYNAMICS SYSTEM

BACKGROUND OF THE INVENTION

This invention relates to generating electricity. More particularly, it relates to magnetohydrodynamics systems which utilize a liquid metal moving by gravity through a magnetic field to generate electricity.

The most common method of generating electricity is by rotating conductors in a magnetic field. This method results in an induced electromotive force or EMF. Large high-speed turbines are utilized in power plants to generate electricity using this method. In order to turn a heavy turbine it is necessary to use large mechanical forces. Pressure generated by steam, which is normally formed by heating water with burning coal or nuclear energy is the preferred force. In some cases hydro power from dams is used to turn the turbines. However because of the conversions of heat energy to mechanical energy and the mechanical energy to electrical energy as well as because of a large number of precision moving parts the above-referenced types of electricity generation are very expensive.

Recently another type of EMF generator has been developed which is referred to as liquid metal magnetohydrodynamics (MHD) system. In a MHD plant high speed turbines are not utilized nor is super hot high pressure steam utilized. A reservoir of liquid metal, such as wood's alloy, is maintained just above the melting temperature of the metal. The reservoir is in an elevated position. A vertically oriented tube carries the liquid metal from the reservoir by gravity past a magnetic field with electrodes being attached to the tube within the magnetic field. As the liquid metal passes through the magnetic field electromotive force is generated across the electrodes due to the movement of the liquid metal. One of the great advantages of using MHD is that metals may be used having low melting points, e.g. below 212° F., therefore low grade waste heat made be used.

Once the liquid metal has passed the magnetic field it must be pumped back up to the reservoir via a lift tube. The technical problem of moving the liquid metal back into the reservoir has been dealt with what is believed to be only limited success by Professor Herman Banover of Ben Gurion University of Israel and Dr. Michael Pertrick of the Argon National Laboratory in Chicago. Basically the Banover and Pertrick solution which is outlined in an article by John Free, Titled "Now: Liquid metal MHD" appearing in the July 1985 issue of Popular Science, is to inject air vapor into the lift tube return path forming a large number of bubbles each acting as a small air piston to push the liquid metal into the elevated reservoir. It has been found that this method of moving the liquid metal into the reservoir has several drawbacks. First of all it takes a great amount of vapor to move the liquid up the lift tube, i.e. approximately five volumes of vapor for one volume of molten material. Furthermore the system is very inefficient because the liquid metal is normally very dense. Also since Banover and Pertrick must minimize the slip between the bubbles and the liquid metal they must choose metals having certain specific surface tensions. Therefore the choice of metal alloys become very limited. It is believed that the alloys chosen by Banover and Pertrick contain mercury which is very expensive and potentially dangerous to the environment.

OBJECTS OF THE INVENTION

It is therefore one object of this invention to provide an improved liquid metal magnetohydrodynamics system.

It is another object to provide a liquid metal magnetohydrodynamics system which has few moving parts and operates efficiently.

It is another object to provide a liquid metal magnetohydrodynamics system which may be operated at relatively low temperatures and pressures and which may utilize a wide range of metals and/or alloys.

It is still another object to provide an improved fluid magnetohydrodynamics system which is environmentally safe.

SUMMARY OF THE INVENTION

In accordance with one form of this invention, there is provided a magnetohydrodynamics system including a reservoir for receiving liquid metal. A channel is connected to the reservoir in a looped arrangement. Preferably the reservoir is elevated above the channel. A magnetic field generating mechanism is located adjacent to a portion of the channel and a pair of electrodes are within the channel and within the magnetic field. A mechanism is provided to solidify at least a portion of the metal, after the metal passes through the magnetic field, forming a piston. A mechanism is provided to move the piston within the channel to the reservoir. Preferably the piston is formed by cooling a portion of the metal thus forming a thin layer of solid metal adjacent to the inside surfaces of the channel and forming a solid bottom for the piston. The preferred means for moving the piston are pressurized fluids such as steam or gas.

BRIEF DESCRIPTION OF THE DRAWINGS

The subject matter which is regarded as the invention is set forth in the appended claims. The invention itself however together with further objects and advantages thereof can be better understood by reference to the following description taken in conjunction with the accompanying drawings, in which:

DESCRIPTION OF THE PREFERRED EMBODIMENT

Figure 1:
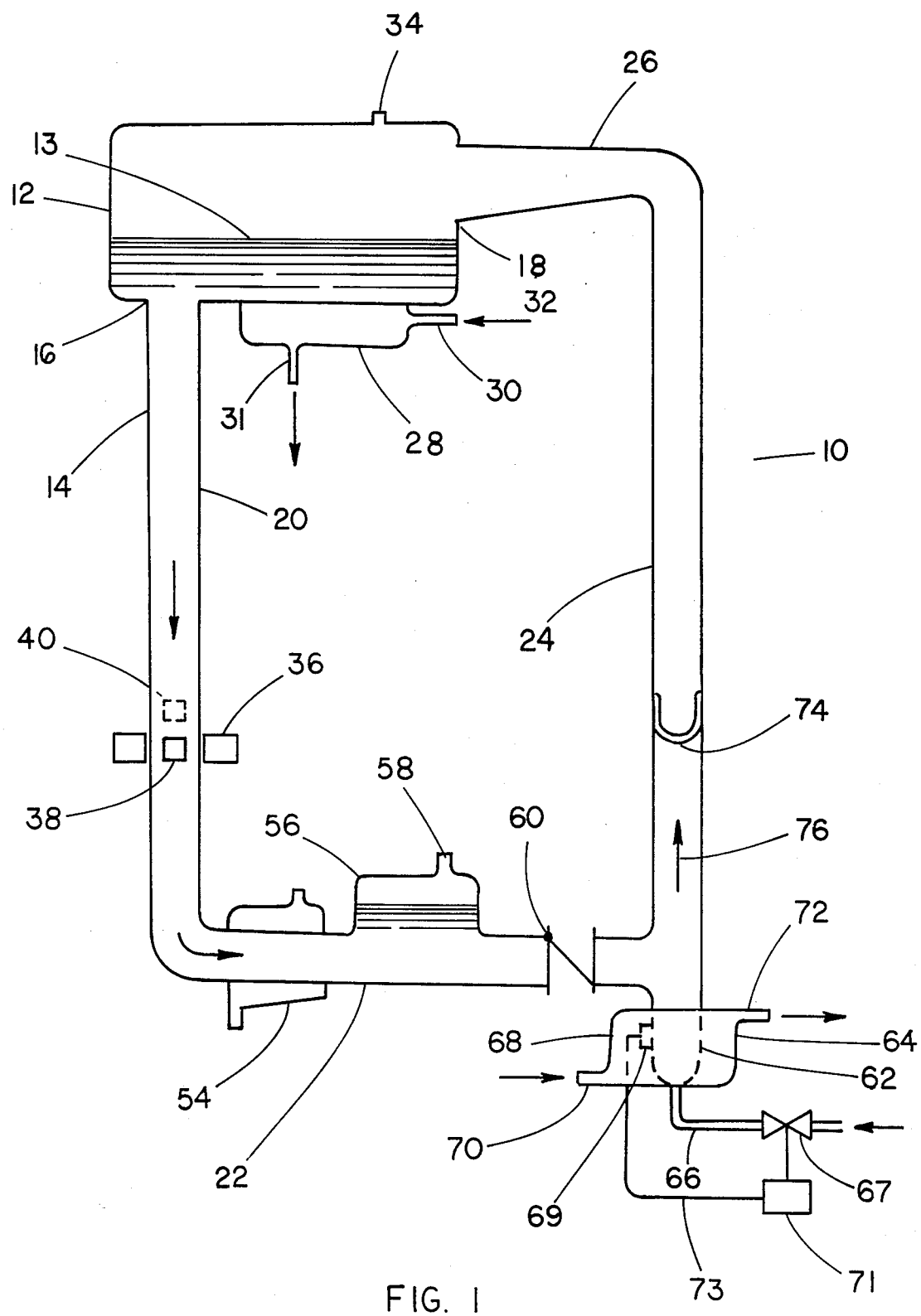
FIG. 1 is a schematic diagram of the magnetohydrodynamics system of the present invention.

Referring now more particularly to FIG. 1, there is provided magneto hydro dynamic system 10 including elevated reservoir 12 and channel 14 which extends from output opening 16 of reservoir 12 to input opening 18 of reservoir 12. Channel 14 in the preferred embodiment includes vertically oriented tube 20 a horizontal tube 22 and a second vertical lift tube 24 as well as a separator 26. The preferred alloys for use in the system are Roses' alloy or Wood's alloy primarily because of their low melting points and further because their component parts are reasonably environmentally safe. Rose's alloy is eight parts bismuth, five parts lead and three parts tin and has a melting point of 200° F. Wood's alloy is four parts bismuth, two parts lead, one part tin, and one part cadmium and has a melting point of 149° F.

Steam vessel 28 is attached to the bottom of reservoir 12 in order to maintain the metal in its liquid state. Steam vessel 28 includes steam input opening 30 and condensate drain 31. Steam enters vessel 28 as indicated by arrow 32. Reservoir 12 also includes overflow fill-up and pressure release opening 34.

Figure 2:
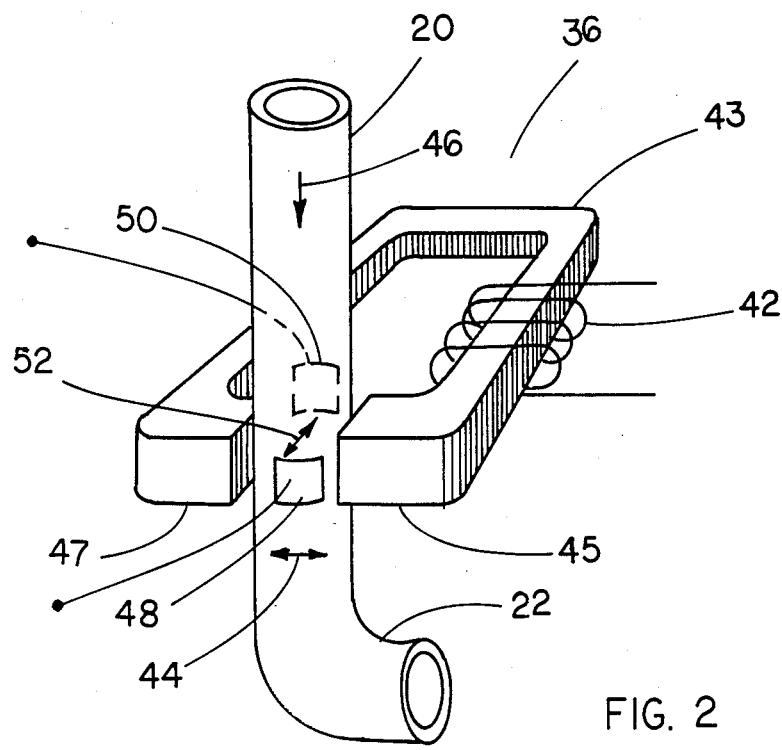
FIG. 2 is a partial perspective view of a magnetohydrodynamics cell which may be utilized in the system of FIG. 1.

A standard MHD cell 36 is connected to tube 20 for providing an EMF across terminals 38 and 40. The MHD cell may be better seen in reference to FIG. 2. Electro magnetic windings 42 are mounted on magnet core 43. The poles 45 and 47 of the core are mounted on opposite sides of tube 20 for providing a magnetic field in a direction of arrow 44 which is perpendicular to the flow of the liquid metal which is indicated by arrow 46. As a result of the flow of the liquid metal in the magnetic field an EMF is generated and an induced electric current is provided on electrodes 48 and 50 which are within channel 20 whereby the moving liquid metal will make contact with the electrodes. The induced electric current provided is also perpendicular to the flow of liquid metal in the direction indicated by arrow 52.

Referring again to FIG. 1 it may be necessary in certain instances to utilize heating jacket 54 to ensure that the metal remains in its liquid state as it passes through tube 22. Tank 56 having a vapor relief opening 58 is also connected to tube 22 to prevent a back-up of liquified metal, i.e. to ensure that the metal remains in continuous flow past MHD cell 36. One-way check valve 60 is also connected to tube 22 to ensure that the flow of metal is only in the direction shown by the arrows within the tubes.

Figure 3:
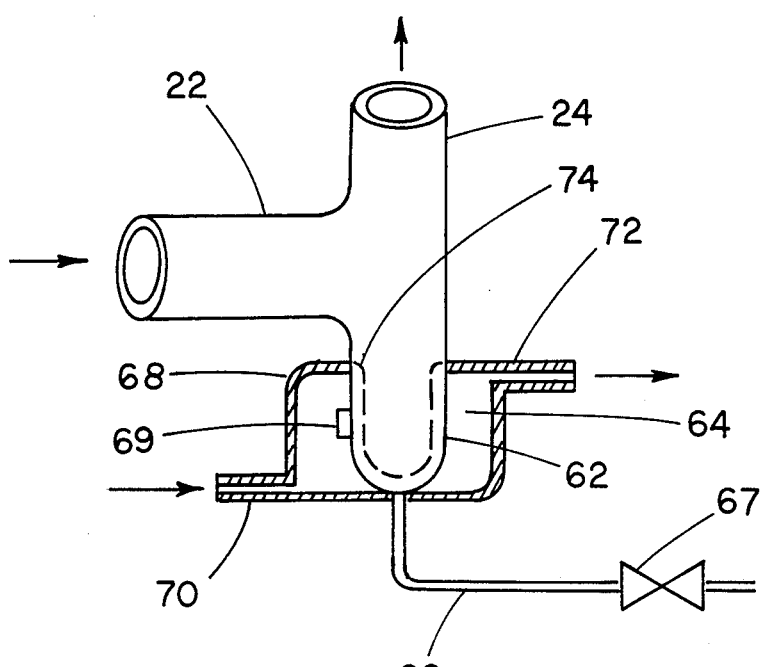
FIG. 3 is a partial perspective view showing a cooling zone which may be utilized in the magnetohydrodynamics system of FIG. 1.

Freeze chamber 62 which is generally cylindrical in shape is connected to tube 22 and tube 24 preferably at the lower most position of the system so that liquid metal will be collected therein. Cooling jacket 64 surrounds the sides and bottom of freeze chamber 62. Fluid tube 66 is connected to the bottom of freeze chamber 62. The cooling chamber may be better seen in reference to FIG. 3. The jacket 68 is spaced from the sides and bottom of freeze chamber 64 forming a reservoir. A source of cold fluid, such as water, is connected to tube 70 which is in turn connected to the jacket 68. Part of the heat from the molten liquid is transferred to the fluid in the jacket and the warmed fluid leaves the jacket through tube 72. The freezing chamber causes a thin layer of the liquid metal to solidify forming a somewhat open, bucket-shaped piston 74 a shown in FIG. 1. The outer diameter of the piston closely matches the inner diameter of tube 24 so that remaining liquid metal will not readily escape around the edges of the piston. Pressurized fluid which is received from tube 66 forces the piston upwardly as indicated by arrow 76. Tube 66 is connected through valve 67 which is controlled by timer/switch 71 which in turn may be controlled by temperature sensor 69 through wires 73. Sensor 69 is mounted on the wall of freeze chamber 62. The temperature of the freeze chamber as indicated by the sensor may modify the frequency with which timer/switch 71 opens valve 67.

The above-described system operates as set forth below. Liquid metal alloy which is received in elevated container 12 runs down tube 20 by gravity, and through MHD cell 36. An EMF is generated across terminals 38 and 40 by the conversion of the mechanical energy of the movement of the molten alloy to electricity. The liquid alloy then flows into tube 22. Heat may be added to tube 22 by heating jacket 54. The liquid alloy then flows through one-way check valve 60 with an excess alloy accumulating in tank 56. A portion of the liquid alloy flows into freeze chamber 62 with another portion of the alloy flowing up to a certain level in tube 24.

Cold water from tube 70 flows through cooling jacket 68 and heat is exchanged between the liquid metal and the cold water thereby causing a thin skin or layer of metal to solidify in the form of a piston having solid sides and a solid bottom.

At a predetermined time pressurized fluid such as steam is injected into the bottom of freeze chamber 62 by the opening of valve 67. Valve 67 is automatically opened on a regular timed cycle which may be lengthened or shortened by the control of temperature sensor 69, which may be a thermocouple. With a balance of temperature of the metal 13 and chamber 62, a predetermined amount of metal solidification will occur in freeze chamber 62. Switch box 71 contains a switch and a timer so that the valve 67 may normally open and then close after a predetermined time. The application of steam at the bottom of piston 74 will cause the piston to travel upwardly through tube 24 thereby carrying itself plus any liquid metal which is above the piston into separation chamber 26, through opening 18 and into reservoir 12.

Steam is applied to opening 30 of steam jacket 28 thus raising the temperature in reservoir 12 thereby reliquifying piston 74. The cycle then repeats itself and the system operates in a continuous fashion and electricity is continuously generated.

Because checkvalve 60 is one-way none of the liquid in tube 24 or liquid which is to the right of checkvalve 60 will flow back towards tube 20. However during the time that there is fluid pressure i.e. steam in tube 24 the fluid traveling through checkvalve 60 will stop. Any excess accumulation of liquid metal will accumulate in container 56 therefore the flow of liquid metal past MHD cell 36 will not slow down.

By utilizing a piston rather than bubbles one volume of steam will lift almost one volume of liquid metal. This approach is much more efficient than known methods of pumping liquid metal by injecting small air bubbles into the liquid.

If the alloy or metal which is used has a melting temperature above the temperature of steam, which is 250° F. at moderate pressures, a hot oil or hot air bath or flue gas could be used to heat the upper tank rather than the steam. Other fluids besides steam may be used to cause the piston to rise. Such fluids include air, water, and haloginated hydrocarbons such as freon. Further, a combustible mixture of air and a fuel may be used.

From the foregoing description of the illustrative embodiment of this invention it will be apparent that many modifications may be made therein. It will be understood therefore that this embodiment of the invention is intended as an exemplification of the invention only and that the invention is not limited thereto. It is to be understood that it is intended that the appended claims cover all such modifications that will fall within the true spirit and scope of the invention.

What is claimed is:

1. A magnetohydrodynamics system for generating electricity: comprising a reservoir for receiving liquid metal; a first tube connected to said reservoir; means for generating a magnetic field adjacent a portion of said first tube; a pair of electrodes located within the magnetic field and connected to said tube and adapted to contact the liquid metal; a second tube connected to said reservoir; means for connecting said first tube to said second tube; means for solidifying at least a portion of the metal; means for forcing at least the solidified portion of said metal through said second tube and into said reservoir.

2. A system as set forth in claim 1 wherein said means for solidifying includes a container connected to said second tube; cooling means surrounding a portion of said container whereby a portion of said metal is formed into a piston.

3. A system as set forth in claim 2 wherein said piston has thin solid walls and a bottom.

4. A system as set forth in claim 3 wherein said piston contains a liquid metal.

5. A system as set forth in claim 2 wherein said system is arranged such that the said reservoir is elevated above said first and second tubes and said piston forming container whereby gravity forces liquid metal past said electrodes for generating electricity and gravity further forces a liquified metal into said piston forming container.

6. A system as set forth in claim 2 further including heating means located adjacent to said reservoir for re-liquifying said metal piston and maintaining the metal in a liquid condition.

7. A system as set forth in claim 2 wherein said cooling means includes a cooling jacket surrounding at least portions of said container.

8. A system as set forth in claim 2 wherein said means for forcing said piston into said reservoir includes fluid pressure means connected to said container whereby said piston and a substantial portion of the liquid metal in said second tube are moved into said reservoir.

9. The system as set forth in claim 2 wherein the inner diameter of said second tube is substantially similar to the outer diameter of said piston.

10. A system as set forth in claim 2 further including an overflow tank and a one-way checkvalve connected between said electrodes and said container.

11. A system as set forth in claim 8 wherein said fluid is taken from the group consisting essentially of steam, air, water, a haloginated hydrocarbon and a combustible mixture of air and fuel.

12. A system as set forth in claim 1 wherein said metal is an alloy.

13. A system as set forth in claim 12 wherein said alloy is Roses' alloy.

14. A system as set forth in claim 12 wherein said ally is Wood's alloy.

15. A system as set forth in claim 1 wherein melting point of said metal is less than 212° F.

16. A system as set forth in claim 1 wherein melting point of said metal is less than 200° F.

17. A magnetohydrodynamics system for generating electricity comprising: a channel having an elevated portion and a lower portion; said channel containing liquid metal having a predetermined melting point; means for generating a magnetic field adjacent a portion of said channel; a pair of electrodes connected to said channel and contacting said liquid metal; said electrodes being in said magnetic field; means for solidifying at least a portion of said metal located in said lower portion of said channel; means for forcing at least said solidified portion of said metal to said upper portion of said channel.

18. A method for generating electricity utilizing liquid metal in a closed loop channel comprising the steps of: passing the liquid metal past a magnetic field in a magnetohydrodynamics cell thereby generating electricity; contacting the moving liquid metal with electrodes in the magnetohydrodynamics cell; solidifying at least a portion of the metal; forcing said solidified metal to a position to be re-liquified; and re-liquifying said solidified metal.

19. A pumping system comprising: a channel having an elevated portion and a lower portion; said channel containing liquid metal having a predetermined melting point; means for solidifying a portion of said liquid metal; means for forcing at least said solidified portions of said metal to said upper portion of said channel.

20. A pump comprising: a flow channel containing a liquid slightly above its freezing temperature; a one-way check valve located in said flow channel; a container connected to said check valve; means for cooling sid container whereby said liquid is at least partly frozen forming a piston; means for contacting said piston with fluid under pressure; a second channel connected to said container, whereby said piston may travel in said second channel by means of said fluid pressure forcing a portion of said liquid ahead of said piston.

* * * * *